United States Patent
Haupt

(10) Patent No.: US 9,492,989 B2
(45) Date of Patent: Nov. 15, 2016

(54) COMPOSITION AND METHOD FOR MANUFACTURE OF A FIBROUS POLYURETHANE COMPOSITE PRODUCT

(76) Inventor: Robert A. Haupt, Christiansburg, VA (US)

(*) Notice: Subject to any disclaimer, the term of this patent is extended or adjusted under 35 U.S.C. 154(b) by 734 days.

(21) Appl. No.: 13/058,740

(22) PCT Filed: Aug. 12, 2009

(86) PCT No.: PCT/US2009/053557
§ 371 (c)(1),
(2), (4) Date: Feb. 11, 2011

(87) PCT Pub. No.: WO2010/019671
PCT Pub. Date: Feb. 18, 2010

(65) Prior Publication Data
US 2011/0189490 A1 Aug. 4, 2011

Related U.S. Application Data

(60) Provisional application No. 61/088,659, filed on Aug. 13, 2008.

(51) Int. Cl.
| | |
|---|---|
| *B32B 27/40* | (2006.01) |
| *B32B 21/02* | (2006.01) |
| *B32B 21/08* | (2006.01) |
| *B32B 27/20* | (2006.01) |

(52) U.S. Cl.
CPC ............... *B32B 27/40* (2013.01); *B32B 21/02* (2013.01); *B32B 21/08* (2013.01); *B32B 27/20* (2013.01); *B32B 2262/062* (2013.01); *B32B 2262/101* (2013.01); *B32B 2262/105* (2013.01); *B32B 2262/106* (2013.01); *B32B 2307/51* (2013.01); *B32B 2307/714* (2013.01); *B32B 2307/7265* (2013.01); *B32B 2307/73* (2013.01); *Y10T 428/31573* (2015.04)

(58) Field of Classification Search
CPC .......... B29C 44/5618; B29C 44/1209; B29C 45/14811; C08J 2375/04; B29K 2075/00; B29K 2713/00; D06N 3/14
USPC ....................................................... 428/424.2
See application file for complete search history.

(56) References Cited

U.S. PATENT DOCUMENTS

| | | |
|---|---|---|
| 3,669,920 A | 6/1972 | Haggis et al. |
| 3,815,301 A | 6/1974 | Beard et al. |
| 3,967,016 A | 6/1976 | Schneller et al. |
| 5,008,359 A | 4/1991 | Hunter |
| 5,140,086 A | 8/1992 | Hunter et al. |
| 5,580,922 A | 12/1996 | Park et al. |
| 5,885,394 A | 3/1999 | Scherzer et al. |
| 2006/0057393 A1 | 3/2006 | Reisch et al. |
| 2006/0182979 A1 | 8/2006 | Dion |
| 2008/0160319 A1 | 7/2008 | Bushendorf et al. |

FOREIGN PATENT DOCUMENTS

WO   PCT/US09/53557   2/2011

*Primary Examiner* — Lynda Salvatore
(74) *Attorney, Agent, or Firm* — Crawford Maunu PLLC

(57) ABSTRACT

A fibrous polyurethane composite and a method for its manufacture is provided comprising a first polymer constituent further comprising a polyurethane catalyst and an active hydrogen compound possessing at least two active hydrogen functional groups, a second polymer constituent further comprising a polyisocyanate pre-polymer, and a fibrous sheet material. In another aspect the fibrous polyurethane composite further comprises a third polymer constituent further comprising at least one active-hydrogen containing fluorinated compound and a polyurethane catalyst.

8 Claims, 1 Drawing Sheet

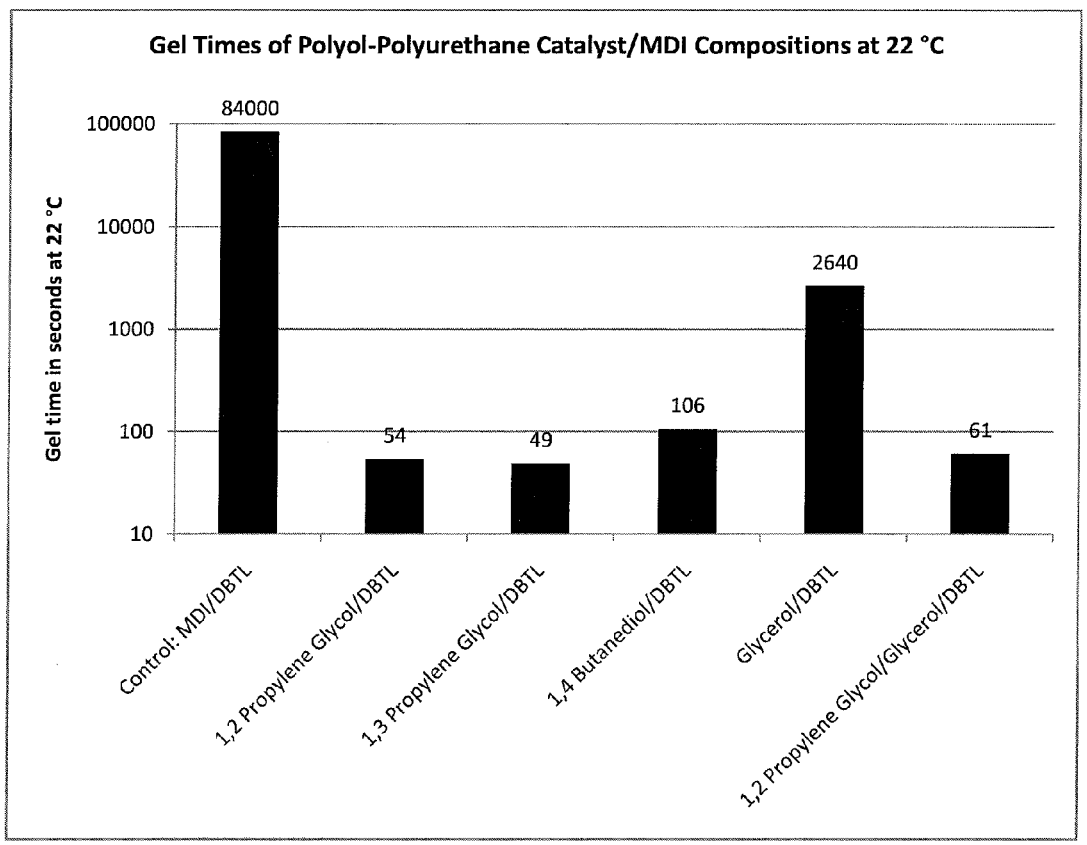

COMPOSITION AND METHOD FOR MANUFACTURE OF A FIBROUS POLYURETHANE COMPOSITE PRODUCT

RELATED PATENT DOCUMENTS

This patent document is the national stage filing under 35 U.S.C. §371 of International Application No. PCT/US2009/053557 filed on Aug. 12, 2009, which claims the benefit, under 35 U.S.C. §119(e), of U.S. Provisional Patent Application Ser. No. 61/088,659 filed on Aug. 13, 2008, each of these patent documents is fully incorporated herein by reference.

FIELD OF THE INVENTION

This invention relates to compositions for fibrous polyurethane composites and methods for manufacturing them.

BACKGROUND

Polyisocyanate pre-polymer resins have proven to be useful in a wide variety of applications, such as paper impregnation, concrete formwork coatings, wood composite adhesives, foundry binders, and polyurethane foams. The applications take advantage of many of the useful properties of isocyanates such as reactivity, strength, flexibility, water resistance, flame resistance, and being free of formaldehyde.

As examples of such applications, there have been uses of an uncatalyzed polyfunctional isocyanate, preferably MDI, to impregnate a cellulosic substrate that is pressed at high temperature and pressure, useful for forming overlays and strong, water resistant laminates. In a particular application, U.S. Pat. No. 5,008,359 describes an implementation in which cure occurs in less than 5 minutes at temperatures between 105 and 245° C. and in between 1 and 2 minutes at temperatures over 150° C. U.S. Pat. No. 5,580,922 discloses that impregnation of paper with MDI diluted with triacetin and/or triethyl citrate will cure at ambient conditions in times as short as 1-2 days to an insoluble polyurea. The impregnated paper has relatively low residual amounts of undesirable isocyanates and 4,4'-diaminophenylmethane present.

In another particular application, U.S. Patent Application No. 20060182979A1 discloses a method of forming and curing a polyisocyanate impregnated fibrous sheet. The sheet is first impregnated with an isocyanate polymerization catalyst in alcohol solution, then dried, then treated with a polyisocyanate composition, and cured. The alcohol solvent drying step occurs at temperatures between 200 and 300° F. The curing step requires heating the polyisocyanate impregnated fibrous sheet to a temperature between 250 and 350° F. The use of an alcohol solvent that must be removed to place a catalyst in the fibrous sheet adds undesirable cost to the product.

SUMMARY

Aspects of the present invention are exemplified in a number of implementations and applications, some of which are shown by way of the figure and characterized in the claims section that follows. For example, certain aspects and implementations of the present invention are directed to the above discussion and/or the manufacturing of economical fibrous polyurethane composites with rapid cure at ambient to moderate temperature.

In a specific embodiment, a method thereof involves forming a fibrous polyurethane composite by preparing a first polymer constituent comprising a polyurethane catalyst and an active hydrogen compound possessing at least two active hydrogen functional groups, preparing a second polymer constituent comprising a polyisocyanate pre-polymer, and impregnating a fibrous web with the first polymer constituent to form an intermediate composition. The second polymer constituent is applied to the intermediate composition, allowing it to penetrate the intermediate composition and to come into contact and react with said first polymer constituent. The first constituent and the second constituent are cured to a polyurethane, thereby forming the fibrous polyurethane composite.

In a more specific embodiment, the fibrous polyurethane composite comprises a first polymer constituent further comprising a polyurethane catalyst and an active hydrogen compound possessing at least two active hydrogen functional groups, a second polymer constituent further comprising a polyisocyanate pre-polymer, and a fibrous sheet material.

In another aspect, the fibrous polyurethane composite further comprises a third polymer constituent comprising at least one active-hydrogen containing fluorinated compound and a polyurethane catalyst.

The above summary discussion is not intended to cover every aspect or implementation in this patent disclosure. The above summary is limited to characterizing certain aspects and is not intended to describe each illustrated embodiment or every implementation of the present invention. The figure(s) and detailed description that follow, including that described in the appended claims, more particularly exemplify these embodiments.

BRIEF DESCRIPTION OF THE DRAWING

One aspect of the present invention may be better understood in consideration of the detailed description of various embodiments of the invention that follows in connection with the accompanying drawing as follows:

FIG. 1 depicts the synergistic effect using an active hydrogen compound and a polyurethane catalyst with a polyisocyanate pre-polymer would have on gel time at 22° C. when combined in a fibrous substrate, consistent with an example embodiment of the present invention.

While the invention is amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the invention as set forth in the appended claims.

DETAILED DESCRIPTION

The present invention is believed to be useful for implementations involving fibrous polyurethane composites and methods for manufacturing them. The present invention has been found to be particularly advantageous for such manufacturing techniques and materials that benefit from rapid curing. While the present invention is not necessarily limited to such applications, various aspects of the invention may be appreciated through a discussion of various examples using this context.

As a first example, an embodiment of the present invention is directed to fibrous-based laminates such as veneers, overlays, low pressure laminates, and high pressure laminates. The fibrous-based laminates are made using a method that involves forming a fibrous polyurethane composite by preparing a first polymer constituent comprising a polyurethane catalyst and an active hydrogen compound possessing at least two active hydrogen functional groups, preparing a second polymer constituent comprising a polyisocyanate pre-polymer, and impregnating a fibrous web with the first polymer constituent to form an intermediate composition. The second polymer constituent is applied to the intermediate composition, allowing it to penetrate the intermediate composition and to come into contact and react with said first polymer constituent. The first constituent and the second constituent are cured to a polyurethane, thereby forming the fibrous polyurethane composite.

A polyisocyanate pre-polymer provides one constituent of a polyurethane polymer matrix for the fibrous composite and also provides inherent advantageous properties of isocyanates. These properties include rapid reactivity under catalysis with hydroxyl functional groups to form urethanes, the ability to be applied as a neat liquid, elastic flexibility, and good moisture resistance.

According to certain applications, suitable polyisocyanate pre-polymer resins may comprise aromatic isocyanates like toluene diisocyanate (TDI) or diphenyl methane diisocyanate (MDI), while aliphatic isocyanates may comprise hexamethylene diisocyanate (HDI), isophorone diisocyanate (IPDI), or hydrogenated MDI ($H_{12}$-MDI), or combinations of any of them. MDI is a preferred isocyanate form. The polyisocyanate pre-polymer has at least two isocyanate functional groups. The term polyisocyanate pre-polymer isocyanate is defined as those isocyanate compositions that have at least two isocyanate (N=C=O) groups available.

As one preferred group of compounds diphenyl methane diisocyanate and its oligomers are utilized. The term "polyisocyanate" is used herein as referring to those compounds having two or more available (N=C=O) functional groups. For certain implementations, it is preferred that the polyisocyanate pre-polymer be of sufficiently low viscosity to achieve penetration of the fibrous substrate in order to come in intimate molecular contact with the active hydrogen containing polyol and the polyurethane catalyst. In a typical application and in connection with an example embodiment of the present invention, practice a lower viscosity material of under 500 cP is useful, under 100 cP is preferred, and a viscosity of 1 to 50 cP under the temperature conditions of application is most preferred for best penetration. Higher viscosity isocyanate pre-polymers may be used with heating or miscible co-solvents, e.g., to reduce the viscosity to the useful range as would be appreciated by those skilled in the art.

The expression "active hydrogen compound" as used herein is furthermore intended to include isocyanate-reactive polyamines as well as polyols. The expression "polyurethane" is thus intended also to include products which comprise urethane linkages (resulting from the reaction of isocyanate groups with hydroxyl groups of polyols) together with urea linkages (resulting from the reaction of isocyanate groups with amine groups of polyamines or with water), and even products which essentially comprise urea linkages with few or no urethane linkages. Since polyamines possess active hydrogen amine functionalities that also can act as polyurethane catalysts, the term "polyurethane catalyst" is to be construed as including polyamines. Suitable polyamines will possess at least two active hydrogen functional groups. Examples of suitable polyamines would include, but not be limited to ethylene diamine, ethylene triamine, diaminopropanes, diaminobutanes, diaminopentanes, diaminohexanes, ethanolamine, aniline, 2,4-toluenediamine, 2,6-toluenediamine, 2,4'-diaminodiphenylmethane, 4,4'-diaminodiphenylmethane, 1,3-phenylenediamine, 1,4-phenylenediamine, naphthylene-1,5-diamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene and 3,5,3',5'-tetraethyl-4,4'-diaminodiphenylmethane. Compounds including at least one amino group and at least one hydroxyl group, or amino alcohols, are also suitable for use with certain embodiments. Examples of suitable amino alcohols include but are not limited to ethanol amine, 1-amino-2-propanol, 2-amino-2-ethyl-1,3-propanediol, N-butyl-diethanol, triethanolamine, 3-diethylamino-1,2-propanediol, 2-amino-2-methyl-1-propanol, 2(N-benzyl-N-methylamino)ethanol, 2-amino-1-phenyl-1,3-propanediol, 2-(2-aminoethylamino)ethanol, diisopropylamino-1,2-propanediol, and tris(hydroxymethyl)aminomethane Amino alcohol derivatives of natural polysaccharides such as chitosan would also be suitable. For many embodiments, essentially any amino alcohol would be suitable provided it is in a form that can physically interact with the liquid polyisocyanate prepolymer to react with it and form a polyurethane.

Using an organic polyol compounds possessing at least two active hydrogen hydroxyl functional groups bearing a catalyst contributes the other backbone constituent for polyurethane polymer matrix formation and delivers the polyurethane catalyst to the polyisocyanate pre-polymer in a stable form. It is also to be understood that the active hydrogen-containing compounds that are capable of reacting with isocyanates in accordance with certain aspects of the invention give a positive test for reactive hydrogen as determined by the Zerewitinoff method. The polyol may be an aliphatic, aromatic, or even amino based pre-polymer. For many more-preferred embodiments, an important factor is its possession of at least two active-hydrogen hydroxyl groups in order to function as a polymeric repeat unit capable of reacting with the polyisocyanate pre-polymer to form the polyurethane polymer. The ability to provide a stable solution with the polyurethane catalyst is often desirable. Reactive compounds such as diols and higher polyols, e.g., triols, glycols, sugars, polyethylene glycols, polysaccharides, polyvinyl alcohols, and or polyhydric phenols, such as resorcinol, phloroglucinol, tannins, lignins, resorcinol-formaldehyde, phenol-resorcinol-formaldehyde, or polyhydric amino resins such as melamine-formaldehyde, urea-formaldehyde, melamine-urea-formaldehyde and the like, may be used. Polyether polyols and polyester polyols may also be used. Examples of suitable diols include but are not limited to ethylene glycol, 1,2-propylene glycol, 1,3-propylene glycol, 1,4-butane diol, diethylene glycol, and polyethylene glycol of various molecular weights. Examples of suitable triols include but are not limited to glycerol and 1,2,6-hexane triol. A mixture of glycerol and 1,2-propylene glycol is preferred. What is important is that the polyol is in liquid form of sufficiently low viscosity to impregnate the fibrous sheet, that it has at least two active hydrogen functional groups, and that it can dissolve the polyurethane catalyst. In typical practice a lower viscosity material of under 500 cP is useful, under 100 cP is preferred, and a viscosity of 1 to 50 cP is preferred for best penetration under the temperature conditions of application. Higher viscosity active hydrogen polyols may be used with heating or with miscible co-solvents to reduce the viscosity to the useful range using methods as would be appreciated by the skilled artisan. Due to the high ambient viscosity of glycerol, it should be heated or mixed with a co-solvent in order to achieve impregnation of the fibrous substrate. Use of the active hydrogen compound and polyurethane catalyst as an impregnation composition can be used to avoid problems associated with using typical alcohol solvents such as methanol, ethanol, or isopropanol to embed the polyurethane catalyst into the fibrous sheet, for example the added capital cost of drying equipment, VOC abatement equipment, and explosion proofing the manufacturing environment.

It is also to be understood that for certain embodiments that active hydrogen-containing compounds capable of reacting with isocyanates as determined by the Zerewitinoff method may also contain fluoroalkyl groups. Active-hydrogen fluoro compounds provide the desirable properties associated with fluorocarbons in a compound that can be covalently bonded with an isocyanate group on the surface of the polyisocyanate pre-polymer component. Examples of desirable properties imparted include chemical inertness, thermo-oxidative stability, lower surface energy, higher contact angle, reduced coefficient of friction, and oleo-hydrophobicity.

A preferred compound for producing a low energy surface film or coating for concrete formwork contains at least one active hydrogen functional group and at least one perfluoroalkyl chain. Without being bound by theory, the active hydrogen functional group is believed to bond covalently to the isocyanate group of the polyisocyanate pre-polymer with the attached perfluoroalkyl group remaining pendant on the polyurethane polymer surface, providing the polyurethane polymer very low surface energy with good abhesive properties when it comes in contact with poured concrete.

Typical active-hydrogen fluorinated compounds used to form the isocyanate functional adducts are a fluoroalkyl containing group having at least 2 carbon atoms and preferably a straight chain or branched chain fluoroalkyl group having 2-20 carbon atoms which optionally can contain oxygen atoms as ether groups or can contain 1-5 chlorine atoms or 1-5 hydrogen atoms. Preferably, the fluorinated compound is a perfluoroalkyl group having 2-20 carbon atoms and most preferably it is a perfluoroalkyl group containing 6-12 carbon atoms. The fluorinated compound also possesses an active hydrogen functional group as determined by the Zerewitinoff method capable of reacting with an isocyanate functional group. Monohydric fluorinated alcohols are preferred compounds, preferably they may have from 1 to 30 carbon atoms, more preferably from 3 to 20, and may be branched, linear, or cyclic. Examples of suitable monohydric fluorinated alcohols are commercially available from DuPont (Zonyl BA-L or Zonyl BA) or Solvay Solexis (D, D 10-H, D10, E, E-10).

A fluorinated polyurethane may be prepared by first coating the polyisocyanate pre-polymer on a fibrous substrate already impregnated with the polyol-polyurethane catalyst composition, then applying the fluorinated active hydrogen compound on it with any suitable method well known in the art and at a temperature between about 20-160° C., preferably 60-85° C. for at least 30 seconds to 240 minutes. The fluorinated active hydrogen compound optionally may be mixed with solvents and a catalyst to facilitate intimate molecular contact and reaction with the polyisocyanate pre-polymer at the surface.

Examples of suitable active-hydrogen perfluorinated alcohols include but are not limited to trifluoroethanol, trifluoropropanol, pentafluoropropanol, hexafluoroisopropanol, hexafluorobutanol, 1H,1H-perfluoro-1-heptanol, 1H,1H-pentadecafluoro-1-octanol, 1H,1H-perfluoro-1-nonanol, 1H,1H-perfluoro-1-decanol, 1H,1H,11H-eicosafluoro-1-undecanol, 1H,1H-perfluoroundecan-1-ol, 1H,1H-perfluoro-1-dodecanol, 1H,1H-perfluoro-1-tetradecanol, 1H,1H-perfluoro-1-hexadecanol, 1H,1H-perfluoro-1-octadecanol, 2,2,3,3-tetrafluoro-1,4-butanediol, 2,2,3,3,4,4-hexafluoro-1,5-pentanediol, 2,2,3,3,4,4,5,5-octafluorohexane-1,6-diol, 2,2,3,3,4,4,5,5-octafluoro-1,6-hexanediol, 2,2,3,3,4,4,5,5,6,6,7,7-dodecafluoro-1,8-octanediol, 1H,1H,10H,10H-perfluorodecane-1,10-diol, 1H,1H,12H,12H-perfluoro-1,12-dodecanediol, perfluoro-tert-butanol, fluorinated triethylene glycol monomethyl ether, fluorinated diethyleneglycol monobutyl ether, fluorinated triethylene glycol monobutyl ether, fluorinated triethylene glycol.

Examples of suitable active-hydrogen perfluoroamine compound include but are not limited to 2,2,2-Trifluoroethylamine, 2,2,3,3,3-Pentafluoropropylamine, 2,2,3,3,4,4,4-Heptafluorobutylamine, 1,1,1,3,3,3-Hexafluoroisopropylamine, 2,2-Difluoroethylamine, 1H,1H-Perfluorooctylamine, 3,3,3-Trifluoropropylamine, Bis(2,2,2-trifluoroethyl)amine, Perfluorotributylamine, Perfluorotriethylamine, Perfluorotripentylamine, Bis(2,2,3,3,3-pentafluoropropyl)amine, Bis(1H,1H-heptafluorobutypamine, and 4,4,4-Trifluorobutylamine.

The polyurethane catalyst acts to increase the rate of reaction between the active hydrogen compound and the polyisocyanate pre-polymer in formation of a polyurethane polymer. The use of catalysts facilitates the rapid curing feature at ambient temperature. One skilled in the art would appreciate that formation of a fibrous polyurethane in less than 10 minutes would be considered rapid and that ambient temperatures could normally be expected to vary between about 15 and 40° C. in typical manufacturing environments. Known catalysts for accelerating the isocyanate-active hydrogen addition reaction may in principle be used in forming these compositions.

Organic metal compounds, especially organic tin compounds, can also be employed as catalysts. Suitable organic tin compounds are tin-(II) salts of carboxylic acids, such as tin-(II) acetate, tin-(II) octoate, tin-(II) ethylhexoate and tin-(II) laurate, and the dialkyl-tin salts of carboxylic acids, such as, for example, dibutyl-tin diacetate, dibutyl-tin dilaurate, dibutyl-tin maleate or dioctyl-tin diacetate. Dibutyl-tin dilaurate and dibutyl tin-(II) octoate are preferred among them.

Lewis acid salts containing multi-valent metals are suitable catalysts, especially salts of tin, mercury, and lead. Stannous chloride and stannous fluoride are preferred. Further suitable catalysts are nitrogen-containing bases such as tetraalkylammonium hydroxides, alkali metal hydroxides such as sodium hydroxide, alkali metal phenolates such as sodium phenolate, or alkali metal alcoholates such as sodium methylate. Hexahydrotriazines may also be employed as catalysts. The combination of lithium, sodium, or potassium phenolates with stannous chloride or stannous fluoride is more preferred with sodium phenolate and stannous chloride being preferred among them. Dibutyl-tin dilaurate is the most preferred catalyst for the active hydrogen polyols and fluorinated compounds.

Other suitable catalysts for this purpose include, for example, tertiary amines, such as triethylamine, tributylamine, triethylene diamine, dimethylethyl amine, pyridine, 4-phenylpropyl pyridine, bis(N,N-dimethylaminoethyl) ether, N,N'-dimethylaminoethyl-N-methyl ethanolamine, N-methyl-morpholine, N-ethyl-morpholine, N,N-dimethylaminoethyl morpholine, quinoline, morpholine, N-methyl morpholine, N,N,N'-tetramethyl-ethylenediamine, 1,4-diaza-bicyclo-(2,2,2)-octane, N-methyl-N'-dimethylaminoethylpiperazine, N,N-dimethylbenzylamine, bis-(N,N-diethylaminoethyl) adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole, 2-methylimidazole, and also hexahydrotriazine derivatives.

Tertiary amines which contain active-hydrogen towards isocyanate groups are, for example, triethanolamine, triisopropanolamine, N-methyl-diethanolamine, N-ethyldiethanolamine, N,N-dimethyl-ethanolamine and their reaction products with alkylene oxides, such as propylene oxide and/or ethylene oxide. Examples of other suitable catalysts are 2,4,6-tris(dimethylaminomethyl)-phenol, methyldiethanolamine, N-methyldipropyldiamine, dibutylaminoethanol, dimethylamino-2-propanol, diethylaminoethoxyethanol and o-tolylpropanolamine. Further suitable catalysts include 1,4-diaza(2,2,2)bicyclooctane, N,N'-bis-dimethyldiethyl-piperazine, hexamethyltriethylenetetramine, dimethylbenzylamine, dimethylcetylamine, 1,8-diazabicyclo[5,4,0]undec-7-ene and tetramethyl-1,3-butanediamine.

Further examples of catalysts which can be used in connection with implementations consistent with the invention, and details of the mode of action of the catalysts, are described in "Kunstoff Handbuch" (Plastics Handbook), Volume VII, published by Becker and Braun, Carl Hanser Verlag, Munich, 1983 on pages 92-98. The catalysts are used in a quantity of about 0.001 to 10% by weight, preferably about 0.002 to 0.1% by weight based on the amount of the polyisocyanate pre-polymer.

For many implementations, most any fibrous material substrate is a suitable raw. Suitable fibrous material substrates that may be coated, bonded, or impregnated include organic fibers such as cellulose, synthetic polymers, or carbon fiber, inorganic fibers such as metal, ceramic, or glass, and combinations thereof. Fibers of any dimensions may be used including nano-dimensioned fibers. The fibrous material may be woven or non-woven and is preferably in sheeted or rolled web form. Examples of cellulosic fibrous material are natural saturating Kraft, recycled saturating Kraft, bleached or unbleached Kraft linerboard, paper products, chemical or thermomechanical pulp, sheets, or mats, and the like. If it is to be used for impregnation, the fibrous material should be sufficiently porous to take up a quantity of the active hydrogen polyol and polyurethane catalyst composition or polyisocyanate pre-polymer constituents. Cellulosic fibrous material is preferred, with Kraft linerboard being most preferred.

Impregnating the cellulosic material can be done by simply passing the cellulosic fibrous material through an application device to achieve the desired resin content of either the active hydrogen polyol or the polyisocyanate pre-polymer constituent. The order of impregnation of the polyurethane polymer constituents is not critical, although impregnation with the polyol-catalyst composition first is more desirable. If desired, either polymer constituent may be preheated to reduce its viscosity and facilitate more rapid penetration of the fibrous substrate and to induce faster cure to the fibrous composition when the reactive polymer constituents of the composition come in contact at a higher temperature. Such a heating step has the advantage of achieving rapid cure while not requiring investment in expensive curing ovens. Suitable application devices include saturation baths with metering rolls, roll coaters, gravure rolls, Meyer bars, slot die extrusion coaters, spray equipment and the like. Any solvents, if used at all, may be removed through drying with conventional forced air oven, infrared radiation, radio frequency radiation, or the like. A relatively low resin content of the first polymer constituent applied in the range of 5 to 25% on oven dry fibrous material weight is preferred in order to achieve a light or even molecular coating of the fibrous substrate material while maintaining some porosity in the fibrous sheet or web prior to introduction of the other polymer constituent. The other polymer constituent is then applied with an appropriate application device and brought into intimate contact with the first pre-polymer constituent, initiating the rapid reaction of the two constituents and producing a fibrous polyurethane composite. The final combined polyurethane polymer content may be from 10 to 300% of the oven dry fibrous material weight, with 10 to 100% being more preferred, and 20 to 50% being most preferred. If desired, although not necessary since it can cure at ambient temperature, the combination of the fibrous materials and both polymer constituents may be heated to accelerate the cure of the polyurethane polymer. In principle, a mixture of the polyol and polyisocyanate pre-polymer constituents may be impregnated into a fibrous substrate, though in practice such impregnation may be difficult due to a rapid increase in viscosity of the mixture.

The impregnated fibrous substrate may then be further coated, if desired, with other materials known in the art, such as primer coatings, glue line coatings, and the like to provide additional performance features. In one embodiment the fibrous substrate is first impregnated with the polyol polymer constituent and then it is coated with the polyisocyanate pre-polymer constituent. Before the combination is allowed to cure completely and while free isocyanate functional groups are available for reaction at the material surface, a composition comprising an active-hydrogen fluorinated compound and a small amount of a polyurethane catalyst are applied to the surface with any suitable method facilitating covalent bond formation and creation of fluorinated polyurethane adducts at the surface of the material. The fluorinated surface is very useful for chemical durability and abhesive usage, especially as a concrete form surface film that does not require the application of form oil. Such a material would create significant environmental and economic benefit in that it would not use or release costly form releases that are currently used into the environment. The fluorinated material could be applied at a low percentage in the range of 0.1 to 10 percent loading by weight based on the weight of the polyisocyanate pre-polymer and still provide excellent surface properties.

While a single sheet of cellulosic material impregnated with the hybrid phenolic-polyurethane polymer composition can be hot pressed to convert and cure the polymer constituents to a polymer, multiple sheets of the impregnated material can be laminated to each other as long as the combined polymer constituents remain in an uncured state to produce a substrate useful as a base layer for a high pressure laminate. Cured or uncured sheets may be laminated to the surface of compatible materials such as wood veneer or reconstituted wood composites, for example, plywood, OSB, MDF, particleboard, hardboard, and the like.

In further accordance with the present invention, several examples are provided to detail successful specific non-limiting implementations which are to be considered. Example 1: Preparation of a polyurethane catalyst in liquid polyol solution. A mixture is made of 100 parts glycerol and 100 parts 1,2-propylene glycol, and 2 parts of dibutyl tin dilaurate which is then dissolved with agitation. Example 2: Impregnation of the polyol catalyst solution followed by polyisocyanate coating. A 69 lb/1000 ft$^2$ sheet of Westvaco linerboard is impregnated with liquid polyol solution of example 1 to an oven dry polymer constituent content of 15 weight % on the sheet plus resin using heat to reduce the viscosity sufficiently to cause penetration. An MDI polyisocyanate pre-polymer, for example Mondur® ML (Bayer Material Science LLC, Pittsburgh, Pa.), a mixture of 4,4' and 2,4' diphenylmethane diisocyanate with a viscosity of 10 cP at 25 C, is then coated equally on both surfaces of the linerboard to a total oven dry polymer constituent content of 30 weight on the sheet plus both parts. The MDI penetrates the capillary network of the web and comes into intimate contact with the polyol catalyst solution. The now contacted polyurethane polymer constituents rapidly cure forming the fibrous polyurethane composite product.

Example 3: Impregnation of the polyisocyanate followed by polyol catalyst solution coating. A 69 lb/1000 ft² sheet of Westvaco linerboard is impregnated with an MDI polyisocyanate pre-polymer, for example Mondur® ML (Bayer Material Science LLC, Pittsburgh, Pa.), a mixture of 4,4' and 2,4' diphenylmethane diisocyanate with a viscosity of 10 cP at 25 C, to an oven dry polymer constituent content of 15 weight % on the sheet plus resin using heat to reduce the viscosity sufficiently to cause penetration. The liquid polyol solution of example 1 is then coated equally on both surfaces of the linerboard to a total oven dry polymer constituent content of 30 weight % on the sheet plus both parts. The polyol catalyst solution penetrates the capillary network of the web and comes into intimate contact with the MDI. The now contacted polyurethane polymer constituents rapidly cure forming the fibrous polyurethane composite product.

Example 4: Application by impregnation and coating to form high pressure laminate (HPL). A 132 lb/3000 ft² sheet of Ohio Paperboard Recycled Natural Kraft Saturating paper is impregnated with the liquid polyol solution of example 1 to an oven dry resin content of 20 weight % on the sheet plus resin. An MDI polyisocyanate pre-polymer, for example Mondur® ML (Bayer Material Science LLC, Pittsburgh, Pa.), a mixture of 4,4' and 2,4' diphenylmethane diisocyanate with a viscosity of 10 cP at 25 C, is then coated on the top surface of the paper web to a total oven dry resin content of 35 weight % on the sheet plus both parts. Five sheets are laid up in this manner to form a laminate assembly and a sixth sheet without the MDI polyisocyanate pre-polymer is laid on the top, followed by a seventh sheet of a fast curing melamine-formaldehyde impregnated decorative sheet. The assembly is placed under 160° C. heat and pressure for 30 seconds. Under pressure, the MDI penetrates the capillary network of the web and comes into intimate contact with the polyol catalyst solution, rapidly curing the now contacted parts into a polyurethane polymer, while the decorative MF surface sheet bonds to the curing laminate assembly forming a fast curing HPL.

Example 5: Preparation of a fluoro-alcohol polyurethane-catalyst solution. To 1000 parts of DuPont Zonyl® BA-L fluoro-alcohol is added 1 part of Dibutyl-tin dilaurate (DBTL). The two materials are mixed to dissolve the DBTL in the Zonyl® BA-L to form a fluoro alcohol polyurethane catalyst solution.

Example 6: Preparation of a no-oil concrete form by impregnation with a polyurethane catalyst in liquid polyol solution and coating with a polyisocyanate pre-polymer and a fluoro-alcohol polyurethane-catalyst solution. A 132 lb/3000 ft² sheet of Westvaco Natural Kraft Saturating paper is impregnated with the liquid polyol solution of example 1 to an oven dry resin content of 20 weight % on the sheet plus resin. An MDI polyisocyanate pre-polymer, for example Mondur® ML (Bayer Material Science LLC, Pittsburgh, Pa.), a mixture of 4,4' and 2,4' diphenylmethane diisocyanate with a viscosity of 10 cP at 25 C, is then coated on the top surface of the paper web to a total oven dry resin content of 29.2 weight % on the sheet plus both parts. The MDI penetrates the capillary network of the web and comes into intimate contact with the liquid polyol solution. The sheet is further coated with a fine mist of the fluoro-alcohol polyurethane-catalyst solution of example 5, rapidly curing the now contacted parts liquid polyol solution and MDI polyisocyanate pre-polymer into a polyurethane polymer, while the now contacted parts MDI polyisocyanate pre-polymer and fluoro-alcohol polyurethane-catalyst solution react to form a fluorinated polyisocyanate at the surface. The opposite or bottom surface of the sheet is coated with a PF glue-line resin and dried for 60 seconds at 105° C. to form a fluorinated surface treated no-oil concrete form overlay. The overlay is then bonded to the surface of a plywood panel to form the no-oil concrete form panel.

EXPERIMENTAL EMBODIMENTS & UNEXPECTED RESULTS

Embodiment 1

Preparation of Fluorinated Alcohol and Polyurethane Catalyst Solutions in Acetone In an 8 ounce Wheaton glass jar 1.0454 g of octafluoropentanol is placed, to which 0.0991 g of dibutyltindilaurate (DBTL) polyurethane catalyst and 24.3358 g of acetone is added. These three components are mixed until a homogeneous liquid is formed. In another 8 ounce Wheaton glass jar 2.0062 g of perfluorodecanol is placed, to which 0.1103 g of dibutyltindilaurate polyurethane catalyst and 24.1478 g of acetone is added. These three components are mixed until a homogeneous liquid is formed.

Embodiment 2

Preparation of Polyol-Polyurethane Catalyst Mixes

Approximately 0.5 g of dibutyltindilaurate and 50 g of a diol or triol as a first polymer constituent material are placed in a 60 mL Nalgene bottle, and mixed until homogeneous. Glycerol (Gly), 1,2-propylene glycol (1,2-PD), 1,3-propylene glycol (1,3-PG), and 1,4-butanediol (1,4-BD) were used The mixes gel at an ambient temperature of 22° C. when combined with Huntsman Rubinate® M isocyanate prepolymer (MDI, $f_n$=2.70, % NCO=31.2%, viscosity=190 cP, equivalent weight=135 g/mol) as a second polymer constituent material. Ambient temperatures may typically range from 15 to 30° C. Results are shown in table 1.

From the gel time results, the combination of the polyurethane catalyst-active hydrogen compound and the polyisocyanate pre-polymer shows unexpected superior gel times at ambient temperature in comparison with the control sample of the polyisocyanate pre-polymer and polyurethane catalyst. The gelation reactions generated a substantial amount of heat, even with relatively small volumes of reactants. A second experiment on the 1,2-propylene glycol/DBTL/MDI combination (1.2226 g MDI and 0.4071 g 1,2-PG/DBTL mix) was unexpectedly very exothermic, with the reaction increasing to a temperature of 128° C. upon gelation in about one minute. The control reaction of MDI and DBTL did not exhibit any exothermic reaction upon mixing.

TABLE 1

Gel times of Polyol-Polyurethane Catalyst Compositions starting at 22° C.

| Material | Weight DBTL in grams | Weight diol in grams | Weight triol in grams | Total Weight in grams | Weight MDI in grams | Weight mix in grams | Gel time in min' & sec' |
|---|---|---|---|---|---|---|---|
| Control | 0.0161 | 0.0000 | 0.0000 | 0.0161 | 3.8008 | 3.8169 | >1400' |
| 1,2 PG | 0.5139 | 50.0133 | 0.0000 | 50.5272 | 1.2313 | 0.5169 | 0'54" |
| 1,3 PG | 0.5124 | 50.0559 | 0.0000 | 50.5683 | 1.2825 | 0.5277 | 0'49" |
| 1,4 BD | 0.5124 | 51.4568 | 0.0000 | 51.9692 | 1.2201 | 0.4077 | 1'46" |
| Glycerol | 0.5284 | 0.0000 | 50.1062 | 50.6346 | 1.1915 | 0.5807 | ~44' |
| 1,2PG/Gly | 0.5218 | 25.0045 | 25.0118 | 50.5381 | 1.1742 | 0.4891 | 1'01" |

Embodiment 3

Diol, Polyurethane Catalyst, and Polyisocyanate Prepolymer with and without a Fluorinated Alcohol Two 125 mm diameter pieces of filter paper (Whatman® catalog no. 1004 125) are treated with the 1,2-propylene glycol/dibutyltindilaurate mixture of embodiment 2 to form an intermediate impregnated paper composition. These compositions are then further treated with Rubinate® M polyisocyanate prepolymer. One sample is allowed to cure at ambient temperature for 18 hours. The second sample is further treated with the acetone solution of perfluorodecanol and also allowed to cure at ambient temperature for 18 hours.

Water droplets are placed on the two samples. The water drops on the sample treated with the fluorinated alcohol (F alcohol) bead up indicating a low surface energy due to the presence of a fluorinated compound, while the water drops on the sample without fluorinated alcohol treatment strike into the treated paper via capillary action. To check for unreacted fluorinated alcohol, the fluorinated alcohol treated sample is washed with acetone to dissolve and remove any unreacted material and then tested with water drops again. Unexpectedly, the water drops bead up again with high contact angles greater than 90°, indicating that the fluorinated surface remains intact even after washing with acetone, while during the washing process the acetone completely wet the paper (Table 2).

TABLE 2

Paper Treated with 1,2-PG/DBTL, MDI, and Fluorinated Alcohol

| Sample | Paper wt | 1,2-PG/ DBTL wt | MDI wt | F alcohol treatment | Water drop test pre acetone | post acetone |
|---|---|---|---|---|---|---|
| 1 | 1.1624 g | 1.3882 g | 2.0194 g | No | wets & wicks | — |
| 2 | 1.2438 g | 2.8511 g | 3.1784 g | Yes | Beads up | Beads up |

Embodiment 4

Impregnated Paper Laminates

A sheet of recycled Kraft paper was cut into square pieces with dimensions 10 cm×10 cm×0.26 mm, a density of 0.65 g/cm$^3$, and a basis weight of 167.5 g/m$^2$. The sheets were subjected to various treatments of the 1,2-propylene glycol/DBTL mixture of embodiment 2,1, 2-propylene glycol, polymeric MDI, and the perfluorodecanol solution of embodiment 1. A mix of 4.9232 g Rubinate® M MDI and 4.9233 g-1,2-propylene glycol was made; stirring was necessary to maintain dispersion due to phase separation. Laminate assemblies were prepared by spreading the individual paper sheets evenly with the first polymer constituent material and allowing it to penetrate the sheet, followed by coating it with the second polymer constituent material, and then positioning the coated sheets into a multi-ply laminate assembly. The laminate assembly was placed in a plastic vacuum bag that was then sealed and a vacuum was drawn on it resulting in one atmosphere of pressure on the assembly. Laminate assemblies were treated with the perfluorodecanol solution either before or after pressing by placing approximately 0.5 g of solution on the surface, spreading it in with a Teflon® coated rod, and allowing it to dry. For contact angles, five droplets of ordinary tap water were placed on each laminate and a digital image was taken after 60 seconds elapsed time. The digital image was then analyzed using computer software to estimate the contact angle of the droplet on the surface. The contact angle data demonstrates the hydrophobic nature of the laminates treated with the fluorinated alcohol, which would provide a superior no-oil surface for concrete form panels. Table 3 provides data on the composition and properties of these laminate assemblies.

One problem that can occur in the preparation of impregnated fibrous composites and in laminates made from them is that the polymer constituents may not come in sufficient contact in order to react and form the desired polymer. Without intimate contact of the two reactive components at the molecular level, residual unreacted prepolymer materials might be left in the polymer. According to one aspect and embodiment of the present invention, the potential problem of insufficient intimate contact is resolved by premixing the reactive components without a catalyst component to achieve intimate molecular contact and then using the mix to impregnate the fibrous composition already pre-impregnated with the polyurethane catalyst-active hydrogen polymer constituent. Sample 4 in Embodiment 4 provides an example of this approach. Sample 4 was prepared by coating one side of two paper sheets lightly with the 1,2-PG/DBTL mix, then coating one side with the 1,2-PG/MDI mix and pressing them together in the vacuum bag. Two such subassemblies were then bonded together in a similar manner. The top and bottom surfaces of sample 4 were treated with 0.3969 g and 0.6437 g of Rubinate® M MDI before treatment with the perfluorodecanol solution to produce the completed composite laminate.

TABLE 3

Lamination of impregnated paper samples following the invention

|  | Sample 1 | Sample 2 | Sample 3 | Sample 4 |
| --- | --- | --- | --- | --- |
| Paper sheets (6.70 g) | 4 | 4 | 4 | 2 + 2 |
| 1$^{st}$ step constituent | 1,2-PG/DBTL | 1,2-PG/Gly/DBTL | MDI | 1,2-PG/DBTL |
| 1$^{st}$ step weight | 3.2850 g | 3.5942 g | 3.7935 g | 2.5687 |
| 2$^{nd}$ step constituent | MDI | MDI | 1,2-PG/DBTL | MDI/1,2-PG |
| 2$^{nd}$ step weight | 2.8781 g | 2.0773 g | 2.3545 g | 3.9863 g |
| F alcohol | Treated | Treated | Untreated | Treated |
| When treated | Pre-press | Post-press | N/A | Post-press |
| Pressing time | 10 minutes | 5 minutes | 9 minutes | 5 minutes |
| Pressing results | Bonded | Bonded | Delaminated | Bonded |
| Properties | Very flexible | Very flexible | Very flexible | Very flexible |
| Contact angle | 100° | 90° | 63° | 99° |

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, including that set forth in the following claims.

What is claimed is:

1. A method comprising:
   forming a fibrous polyurethane composite, including:
      preparing a first polymer constituent that includes a polyurethane catalyst and an active hydrogen compound possessing at least two active hydrogen functional groups;
      preparing a second polymer constituent that includes a polyisocyanate pre-polymer;
      and the set of steps selected from the group consisting of:
      A. impregnating a fibrous web with the first polymer constituent to form an intermediate composition;
         applying the second polymer constituent to said intermediate composition and allowing it to penetrate said intermediate composition and come into contact and react with the first polymer constituent previously impregnated into the fibrous web; and
         allowing the first constituent and the second constituent to cure to a polyurethane at ambient temperature forming said fibrous polyurethane composite, and
      B. impregnating a fibrous web with the second polymer constituent to form an intermediate composition;
         applying the first polymer constituent to said intermediate composition and allowing it to penetrate said intermediate composition and come into contact and react with the second polymer constituent previously impregnated into the fibrous web; and
         allowing the first constituent and the second constituent to cure to a polyurethane at ambient temperature forming said fibrous polyurethane composite.

2. The method of claim 1, wherein the active hydrogen compound has a molecular weight less than that of polyethylene glycol 400, about 400 g/mol.

3. The method of claim 1, wherein the active hydrogen compound includes a polyol with at least two hydroxyl groups, a polyamine with at least two amine groups, an amino alcohol with at least one hydroxyl group and at least one amine group, or mixtures thereof.

4. The method of claim 1 wherein the polyurethane catalyst is selected from a group consisting of: Lewis bases, Lewis acids, insertion catalysts, metal catalysts, alkali metal salts of organic acids and phenols, and mixtures thereof.

5. The method of claim 1, wherein the polyisocyanate pre-polymer is at least a monomer of diphenylmethane diisocyanate and has at least two isocyanate functional groups.

6. The method of claim 1, further including the step selected from the group consisting of:
   heating said first polymer constituent prior to the step of impregnating a fibrous web with the first polymer constituent to form an intermediate composition; and
   heating said second polymer constituent prior to the step of applying the second polymer constituent to said intermediate composition and allowing it to penetrate said intermediate composition in order to come into contact and react with said first polymer constituent, and combination thereof.

7. The method of claim 1, further comprising the step of applying a third constituent that includes at least one active hydrogen containing fluorinated compound
   wherein the active hydrogen containing fluorinated compound is selected from the group consisting of fluoroalcohols with at least one hydroxyl group and fluoroamines with at least one amine group, and
   applying a polyurethane catalyst to said fibrous polyurethane composite prior to complete cure of said fibrous polyurethane composite and curing the first constituent, the second constituent, and the third constituent to a polyurethane, to form said fibrous polyurethane composite.

8. The method of claim 1, wherein ambient temperature is in the range of about 15 to 40° C.

* * * * *